US007382878B2

(12) United States Patent
Volpert, Jr.

(10) Patent No.: US 7,382,878 B2
(45) Date of Patent: Jun. 3, 2008

(54) SYSTEM AND METHOD FOR DATA ENCRYPTION

(75) Inventor: Thomas R. Volpert, Jr., Chicago, IL (US)

(73) Assignee: Uponus Technologies, LLC, Wilmette, IL (US)

( * ) Notice: Subject to any disclaimer, the term of this patent is extended or adjusted under 35 U.S.C. 154(b) by 647 days.

(21) Appl. No.: 09/888,316

(22) Filed: Jun. 22, 2001

(65) Prior Publication Data

US 2003/0016820 A1      Jan. 23, 2003

(51) Int. Cl.
G09C 1/04    (2006.01)
H03M 7/30    (2006.01)
H03M 7/40    (2006.01)
H03M 5/00    (2006.01)
H04K 1/02    (2006.01)
H03M 7/42    (2006.01)

(52) U.S. Cl. .................. 380/37; 380/217; 341/55; 341/60; 341/65; 707/101; 382/237

(58) Field of Classification Search ................. 380/37, 380/217; 382/237
See application file for complete search history.

(56) References Cited

U.S. PATENT DOCUMENTS

| 3,656,178 | A | * | 4/1972 | De Maine et al. ............ 341/87 |
| 4,117,470 | A | | 9/1978 | Elliott |
| 4,200,770 | A | | 4/1980 | Hellman |
| 4,218,582 | A | | 8/1980 | Hellman |
| 4,319,079 | A | | 3/1982 | Best |
| 4,386,416 | A | | 5/1983 | Giltner |
| 4,405,829 | A | | 9/1983 | Rivest |
| 4,424,414 | A | | 1/1984 | Hellman |
| 4,494,151 | A | | 1/1985 | Liao |
| 4,558,302 | A | | 12/1985 | Welch |

(Continued)

OTHER PUBLICATIONS

Schneier, Bruce "Applied Cryptography" 1996, John Wiley and Sons, Second Edition, pp. 225.*

(Continued)

*Primary Examiner*—Ayaz Sheikh
*Assistant Examiner*—Matthew T Henning
(74) *Attorney, Agent, or Firm*—Oblon, Spivak, McClelland, Maier & Neustadt, P.C.

(57) ABSTRACT

A system and method for encrypting and/or compressing an input data string is disclosed. The input data string is divided into a plurality of blocks of data that each contains a plurality of bits of data. A block code is used to identify the size of each of the blocks of data. The blocks of data are analyzed to determine how frequently different groups of bits of data are present within each block of data. The blocks of data are also analyzed to determine whether certain relationships among the groups of bits of data exist within the blocks of data. After the blocks of data are analyzed, and in response to the analyses, a control code is generated for each block of data through the use of a control code index. After the control code for each block of data is generated, a position code is also generated for each block of data in response to the control code for the corresponding block of data. The control code, block code, and position code for each of the blocks of data can then be combined to produce an encrypted data string.

33 Claims, 5 DrawingSheets

U.S. PATENT DOCUMENTS

| | | | |
|---|---|---|---|
| 4,612,532 A * | 9/1986 | Bacon et al. | 341/51 |
| 4,700,175 A | 10/1987 | Bledsoe | |
| 4,701,745 A | 10/1987 | Waterworth | |
| 4,814,746 A | 3/1989 | Miller | |
| 4,852,168 A | 7/1989 | Sprague | |
| 4,899,148 A | 2/1990 | Sato | |
| 5,003,307 A | 3/1991 | Whiting | |
| 5,016,009 A | 5/1991 | Whiting | |
| 5,049,880 A | 9/1991 | Stevens | |
| 5,109,437 A * | 4/1992 | Honda | 382/244 |
| 5,126,739 A | 6/1992 | Whiting | |
| 5,181,031 A | 1/1993 | Tong | |
| 5,227,789 A | 7/1993 | Barry | |
| 5,239,298 A | 8/1993 | Wei | |
| 5,293,379 A | 3/1994 | Carr | |
| 5,351,299 A | 9/1994 | Matsuzaki | |
| 5,448,642 A | 9/1995 | Yeh | |
| 5,453,843 A | 9/1995 | Levy | |
| 5,463,699 A | 10/1995 | Wilkinson | |
| 5,471,207 A | 11/1995 | Zandi | |
| 5,479,512 A * | 12/1995 | Weiss | 380/28 |
| 5,486,826 A * | 1/1996 | Remillard | 341/51 |
| 5,517,614 A | 5/1996 | Tajima | |
| 5,532,694 A * | 7/1996 | Mayers et al. | 341/67 |
| 5,600,726 A | 2/1997 | Morgan | |
| 5,861,887 A * | 1/1999 | Butler et al. | 345/428 |
| 5,872,530 A * | 2/1999 | Domyo et al. | 341/106 |
| 5,884,269 A * | 3/1999 | Cellier et al. | 704/501 |
| 5,899,988 A * | 5/1999 | Depledge et al. | 707/3 |
| 5,940,833 A * | 8/1999 | Benson | 707/100 |
| 6,502,064 B1 * | 12/2002 | Miyahira et al. | 704/7 |
| 6,597,812 B1 * | 7/2003 | Fallon et al. | 382/232 |
| 6,772,343 B1 * | 8/2004 | Shimizu et al. | 713/193 |
| 6,885,749 B1 * | 4/2005 | Chang et al. | 380/269 |
| 7,035,407 B1 * | 4/2006 | Hasegawa | 380/37 |
| 7,076,060 B1 * | 7/2006 | Bilchev | 380/37 |
| 7,227,948 B2 * | 6/2007 | Ohkuma et al. | 380/37 |

OTHER PUBLICATIONS

Witten et al. "On the Privacy Afforded by Adaptive Text Compression", 1988, Elsevier Science Publishers Ltd. Computers and Security, vol. 7, pp. 397-408.*

IBM TDB NN71012438, "Data Compression Algorithms" 1971 IBM Corporation.*

Witten et al., On the Privacy Afforded by Adaptive Text Compression, 1988, Elsevier Science Publishers Ltd. pp. 397-408.*

Jones, Christopher B., An Efficient Coding System for Long Source Sequences, 1981, IEEE, pp. 280-291.*

C.-Y. Chan and Y.E. Ioannidis. An efficient bitmap encoding scheme for selection queries. In Proc. Int. Conf. on Management of Data (SIGMOD), pp. 215-226, 1999.*

Uponus, C.2000 web page, Inkado Plug-in Suite for Adobe PhotoShop.

* cited by examiner fig 3      62

|     | Order       | Control Code |     | Order       | Control Code |
|-----|-------------|--------------|-----|-------------|--------------|
| 1.  | 00-01-10-11 | 00011000     | 25. | 10-00-01-11 | 10000110     |
| 2.  | 00-01-10-11 | 00011011     | 26. | 10-00-01-11 | 10000111     |
| 3.  | 00-01-11-10 | 00011100     | 27. | 10-00-11-01 | 10001110     |
| 4.  | 00-01-11-10 | 00011110     | 28. | 10-00-11-01 | 10001101     |
| 5.  | 00-10-01-11 | 00100100     | 29. | 10-01-00-11 | 10010010     |
| 6.  | 00-10-01-11 | 00100111     | 30. | 10-01-00-11 | 10010011     |
| 7.  | 00-10-11-01 | 00101100     | 31. | 10-01-11-00 | 10011110     |
| 8.  | 00-10-11-01 | 00101101     | 32. | 10-01-11-00 | 10011100     |
| 9.  | 00-11-01-10 | 00110100     | 33. | 10-11-00-01 | 10110010     |
| 10. | 00-11-01-10 | 00110110     | 34. | 10-11-00-01 | 10110001     |
| 11. | 00-11-10-01 | 00111000     | 35. | 10-11-01-00 | 10110110     |
| 12. | 00-11-10-01 | 00111001     | 36. | 10-11-01-00 | 10110100     |
| 13. | 01-00-10-11 | 01001001     | 37. | 11-00-01-10 | 11000111     |
| 14. | 01-00-10-11 | 01001011     | 38. | 11-00-01-10 | 11000110     |
| 15. | 01-00-11-10 | 01001101     | 39. | 11-00-10-01 | 11001011     |
| 16. | 01-00-11-10 | 01001110     | 40. | 11-00-10-01 | 11001001     |
| 17. | 01-10-00-11 | 01100001     | 41. | 11-01-00-10 | 11010011     |
| 18. | 01-10-00-11 | 01100011     | 42. | 11-01-00-10 | 11010010     |
| 19. | 01-10-11-00 | 01101101     | 43. | 11-01-10-00 | 11011011     |
| 20. | 01-10-11-00 | 01101100     | 44. | 11-01-10-00 | 11011000     |
| 21. | 01-11-00-10 | 01110001     | 45. | 11-10-00-01 | 11100011     |
| 22. | 01-11-00-10 | 01110010     | 46. | 11-10-00-01 | 11100001     |
| 23. | 01-11-10-00 | 01111001     | 47. | 11-10-01-00 | 11100111     |
| 24. | 01-11-10-00 | 01111000     | 48. | 11-10-01-00 | 11100100     |

Fig 4  64

| | Order | Control Code |
|---|---|---|
| 1. | 00-01-10-11 | 00000000-00011000 |
| 2. | 00-01-10-11 | 00000000-00011011 |
| . | . | . |
| . | . | . |
| 48. | 11-10-01-00 | 00000000-11100100 |
| 49. | 000-001-010-011-100-101-110-111 | 00000000-11100101 |
| . | . | . |
| . | . | . |
| 40,368. | 111-110-101-100-011-010-001-000 | 11111111-11111111 |

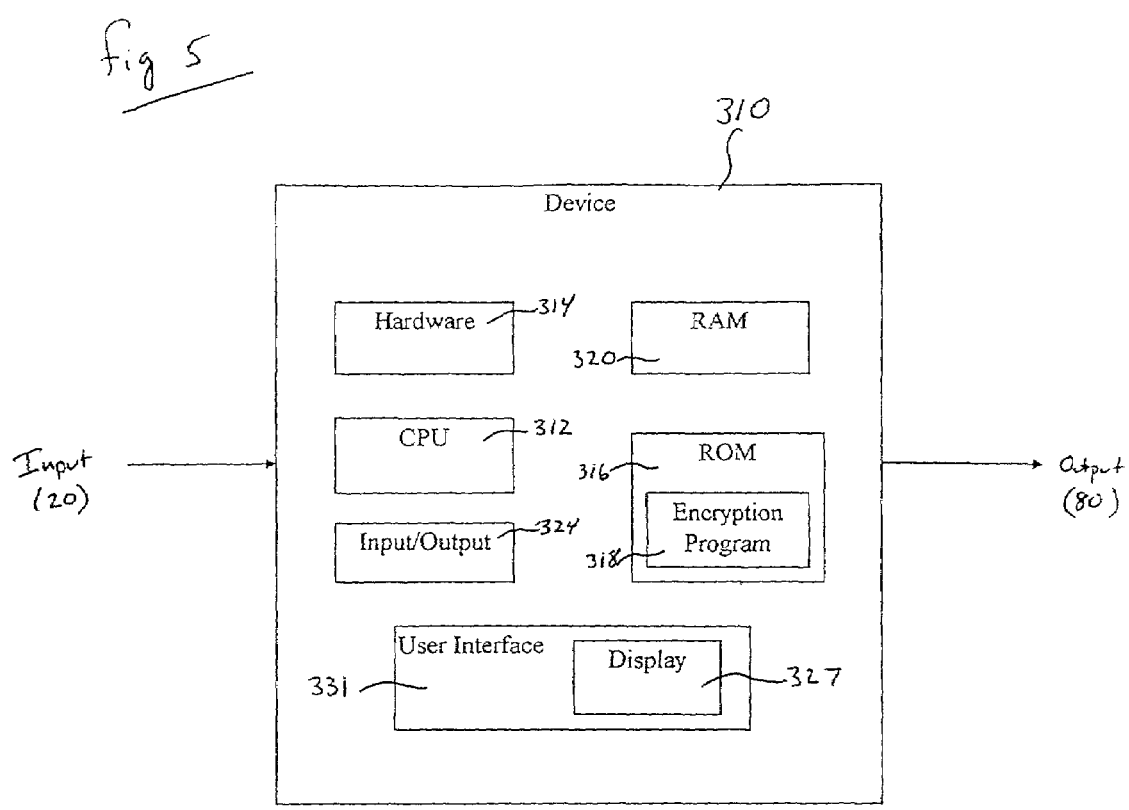

SYSTEM AND METHOD FOR DATA ENCRYPTION

The present invention relates generally to the manipulation of digital data and in particular, to a novel encryption method that has advantages over known encryption methods. Specifically, the present invention relates to an improved method for the encryption of digital data, including the use of password iteration, as well as the lossless compression of the digital data and the predictiveness thereof.

BACKGROUND OF THE INVENTION

The proliferation of computers has resulted in an increased usage of digital data in the transmission, storage, and use of text, graphics, sound and video. As the use of digital data increases, the need to secure and protect this data also increases. One common method of protecting digital information is through the use of encryption. Encryption generally refers to the reversible transformation of data into a form in which the context of the original data cannot be ascertained by normal examination of the data. Moreover, only those who know how the data was manipulated can perform the reverse function and restore the data to its original form. Encryption systems are numerous and well know.

For example, some current encryption systems perform a complex mathematical operation on the original data in response to an encryption key or password. The encryption key may be a large prime number. Thus, the mathematical operations used to encrypt data may involve floating decimal point calculations. These systems are complex and require relatively significant amounts of time to complete due to the complex calculations. Additionally, these systems may operate on a fixed size block of data which cannot be varied. Because the block size cannot be varied, the resulting encrypted data may include repetitive patterns that make the encrypted data susceptible to various crypto-analysis techniques which can readily decipher the encrypted data. Also, these systems typically produce an encrypted set of data that is larger in size than the original unencrypted data. Accordingly, these systems may require the use of a separate compression routine prior to encryption in order to limit the size of the resulting data after encryption.

BRIEF SUMMARY OF THE INVENTION

The present embodiments provide an effective, efficient and improved method and system for encrypting and/or compressing digital data. In one embodiment, an input data string is divided into blocks of data containing a varying number of bits. A block code can be used to indicate the number of bits within each block of data. Successive groups of bits of data within each block of data are analyzed to determine the frequency of the different combinations of bits and to determine whether certain relationships exist between the combinations of bits. In response to these analyses, a control code is generated through the use of a control code index. In response to the control code, a position code is generated that identifies the position of the combinations of groups of bits with respect to the data within each block. The control code, block code, and position code can be combined to produce an encrypted data string. These procedures can be recursively applied to the resulting encrypted data to further enhance the encryption of the original data.

Accordingly, it is the principal object of the present invention to provide an improved method and system for encrypting data.

It is also an object of the invention to provide an improved method and system for the lossless compression of data.

It is an additional object of the present invention to provide an improved method and system for encrypting data utilizing password iteration.

It is another object of the present invention to provide an improved method and system for the lossless compression of data and the predictiveness thereof.

Numerous other advantages and features of the invention will become readily apparent from the detailed description of the preferred embodiment of the invention, from the claims, and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIG. 3 is a sample control code index of a first preferred embodiment.

FIG. 4 is a sample control code index of a second preferred embodiment.

FIG. 5 is a block diagram depicting one embodiment of a system for encrypting data.

DETAILED DESCRIPTION OF THE PREFERRED EMBODIMENT OF THE PRESENT INVENTION

Figure 1:
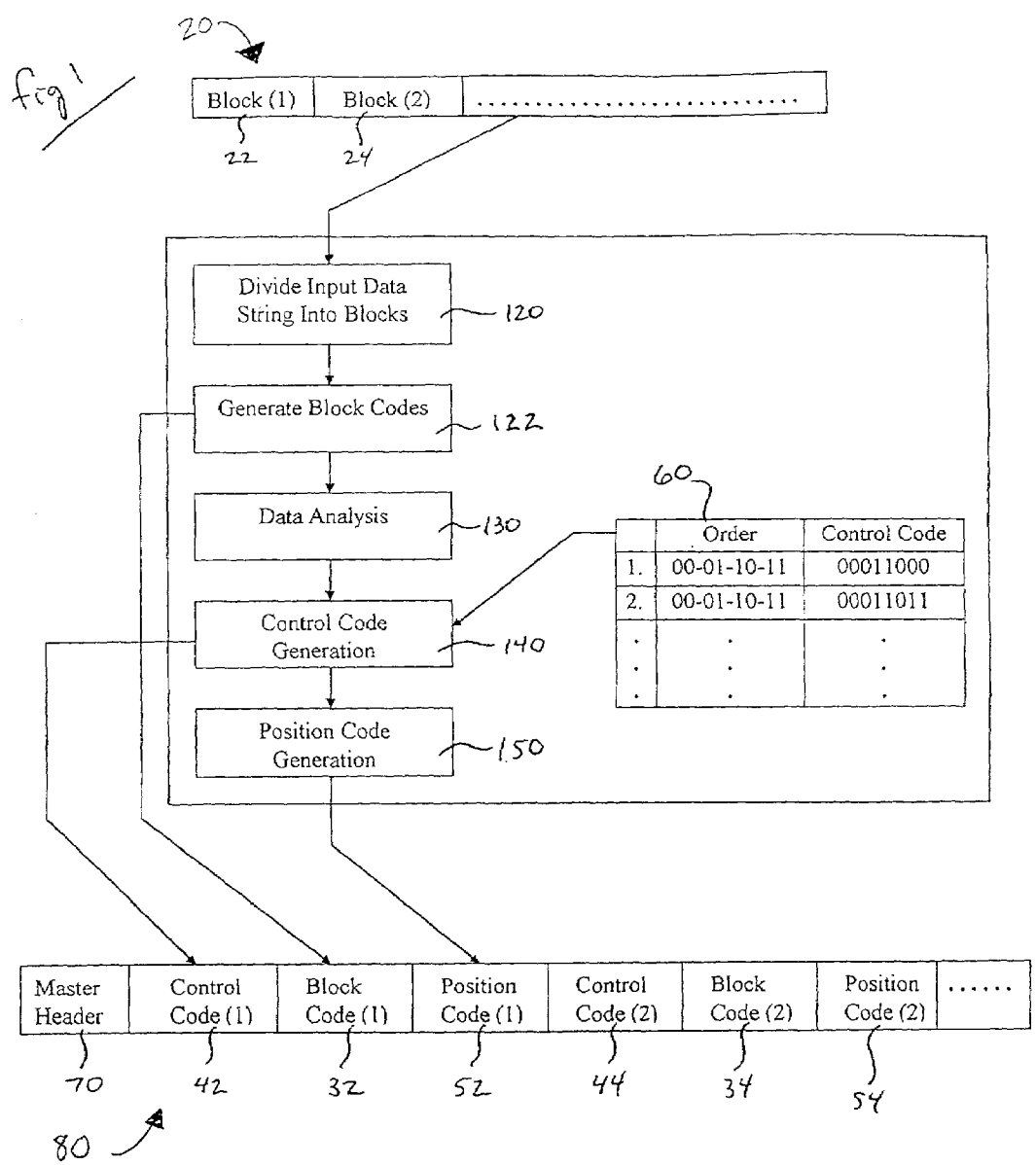
FIG. 1 is a block diagram and flow chart depicting one embodiment of a method for encrypting data.

While the invention is susceptible of embodiment in many different forms, there is shown in the drawings and will be described herein in detail preferred embodiments of the invention. It should be understood however that the present disclosure is to be considered an exemplification of the principles of the invention and is not intended to limit the spirit and scope of the invention and/or claims of the embodiments illustrated.

I. Method

A. Overview

Referring now to FIG. 1 the present method begins with the receipt of an input data string 20. The input data string 20 represents the original data prior to encryption. After the input data string 20 is received, it is divided into a plurality of blocks of data 22, 24, (step 120) each containing a plurality of bits of data. A block code 32, 34 is generated (step 122) for each block of data that identifies the number of bits of data within each block. After the block codes 32, 34 are generated, the blocks of data 22, 24 are analyzed (step 130). After the blocks of data 22, 24 are analyzed, a control code 42, 44 is generated (step 140) for each block of data 22, 24. The control code 42, 44 is generated through the use of a control code index 60. After the control code 42, 44 is generated (step 140), a position code 52, 54 is generated (step 150) for each block of data 22, 24. The position code 52, 54 for each block of data 22, 24 is generated in response to the control code 42, 44 for the corresponding block of data 22, 24. The control code 42, 44 and the position code 52, 54 can then be combined to produce an encrypted data string

80. The encrypted data string 80 includes the same content as the input data string 20, but concealed under normal analysis. Each of these processes are described in greater detail below.

B. Dividing the Data Into Blocks

Figure 2:
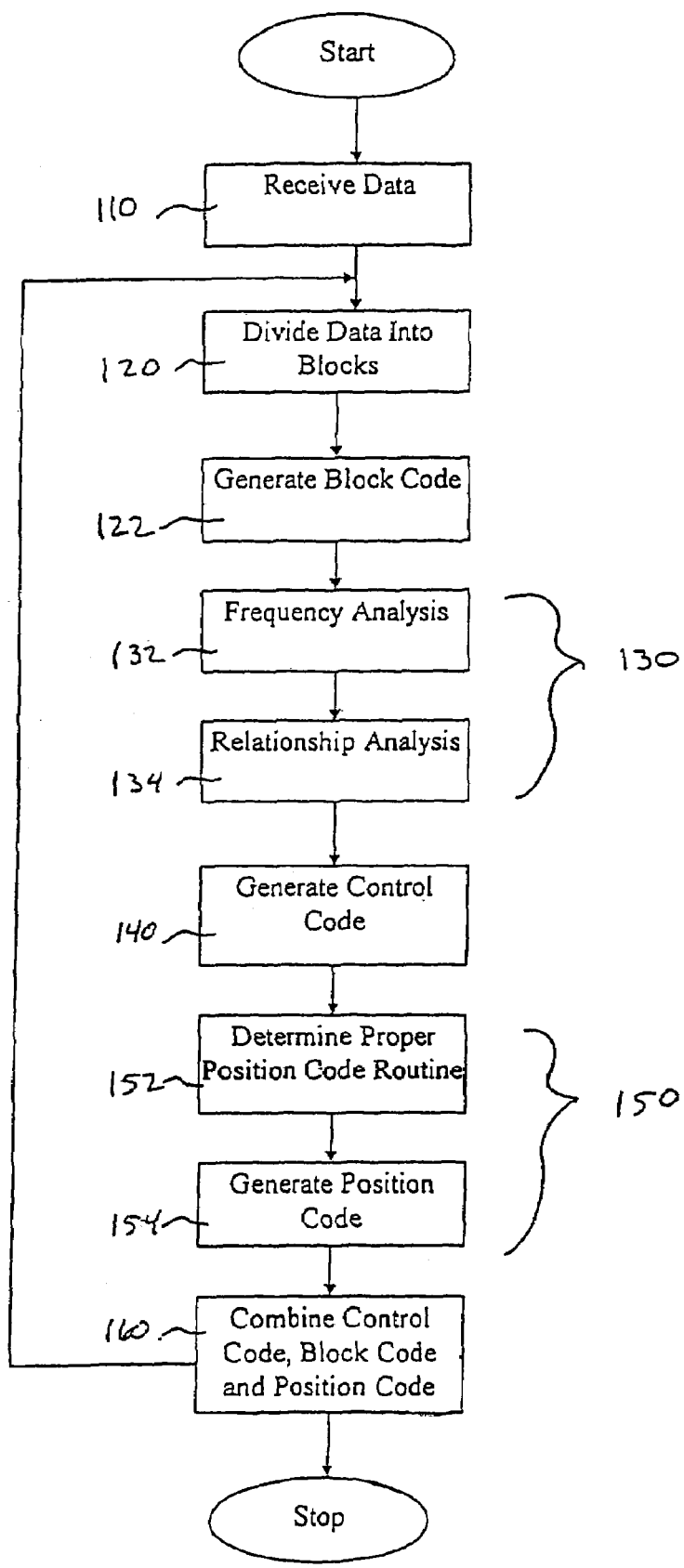
FIG. 2 is a more detailed flow chart of the method depicted in FIG. 1.

Referring now to FIGS. 1 and 2, after the input data string 20 is received (step 110, FIG. 2), it is divided into a plurality of blocks of data 22, 24 (step 120). The input data string 20 can comprise any type of content including: text data, image data, sound data or video data. In addition, the input data string 20 can comprise data in an uncompressed state or a compressed state as a result of lossless or lossy compression. The input data string 20 can comprise unencrypted data or data previously encrypted by any other encryption method. The input data string 20 can also be of any size including: a file, a file fragment, a folder of files or an entire disk of folders. The blocks of data 22, 24 each comprise a random number of bits of data. The specific number of bits that comprise each block of data 22, 24 can be determined in response to a random number generator as known to those skilled in the art. After the size of each block of data 22, 24 has been determined, the size of each block of data 22, 24 is recorded as a block code 32, 34 (step 122). The block code 32, 34 preferably comprises eight bytes of data.

C. Data Analysis

The data analysis (step 130) begins after the input data string 20 has been divided into blocks of data 22, 24 and the block codes 32, 34 have been generated. The data within each block 22, 24 is analyzed to determine whether certain characteristics exist within the data. In response to the presence or absence of these characteristics, the step of generating the position code (step 150) can be altered, as described below, so that the input data string 20 can be compressed simultaneously as it is encrypted. The data within each block 22, 24 is analyzed by examining successive groups of bits within each block 22, 24. The groups of bits are examined to determine which combination of bits the group of bits matches. For groups of n bits there are $2^n$ different combinations of bits. Thus, for groups of two bits of data, there are four different combinations of two bits (i.e., 00, 01, 10, 11).

The process of analyzing the data comprises a frequency analysis (step 132, FIG. 2) and a relationship analysis (step 134). The frequency analysis (step 132) involves determining the relative frequencies of each of the combinations of bits. Accordingly, the combination of bits that occurs most frequently is determined as well as the combination that occurs the second most frequently, and so on. Thus, for groups of two bits, the relative frequencies of each of the four different combinations of bits are determined by counting the number of groups of bits that matches each of the four combinations of bits as described herein. The results of the frequency analysis (step 132) can be used to generate the control code 42, 44 as indicated below.

The relationship analysis (step 134) involves determining whether or not a specific relationship between the combinations of bits exists within each block of data 22, 24. The relationship analysis can involve determining whether or not a specific relationship between the most frequently occurring combination of bits and the third and fourth most frequently occurring combination of bits exists. This determination can be made based on the satisfaction of a predetermined requirement which may be expressed as a mathematical formula. One example of a formula that can be used to determine whether such a relationship exists is the following:

$$[Freq1 > (Freq3 + Freq4)]$$

(where Freq1=the number of times the most frequently occurring combination appears in the block of data, Freq3=the number of times the third most frequently occurring combination appears in the block of data, and Freq4=the number of times the fourth most frequently occurring combination appears in the block of data). In response to the frequency analysis (step 132), the appropriate values can be utilized to solve the equation. In solving this equation, if the result is a true statement, the relationship between the groups of bits is determined to exist. Conversely, if the result is a false statement, the relationship between the groups of bits is determined not to exist. The results of the relationship analysis (step 134) can also be used to generate the control code 42, 44 and control the generation of the position code 52, 54 as indicated below.

D. Control Code Generation

A control code 42, 44 is generated (step 140) for each block 22, 24 in response to the results of the data analysis (step 130). The control code 42, 44 dictates: (1) the number of bits that comprise each of the groups of bits that are analyzed during the encryption of the input data string 20 and decryption of the encrypted string of data 80; (2) the order in which the combinations of bits are identified in the position code 52, 54; (3) the position code routine that is used to generate position code 52, 54; and (4) whether or not additional encryption is utilized. The control code 42, 44 preferably comprises eight bits of data thereby allowing for 256 different control codes.

In generating the control code 42, 44, a control code index 60 is utilized. The control code index 60 comprises a list of control codes that each correspond to a specific order of the combinations of bits. The four combinations of two bits (00, 01, 10, 11) can be arranged in 24 different orders. One or more different control codes can be assigned to the same order of the combinations of bits as seen in the control code index 60. Each different control code can signify that a different position code routine can be used to generate the position code or that additional encryption will be used to further encrypt the data. Each of these concepts is discussed in more detail below. In the control code index 60, the odd numbered control codes can signify one set of control codes that implicate the use of a first position code routine while the even numbered control codes can signify a second set of control codes that implicate the use of a second position code routine. Alternatively, any scheme can be used to signify the use of the first or second position code routines.

Generating the control codes (step 140) involves selecting a control code from the control code index 60 in response to the data analysis (step 130). This selection process involves both selecting the specific order of the combinations of bits and selecting a specific control code that corresponds to the selected order. The specific order of the combinations of bits is selected so that the combinations of bits are listed in descending order from the most frequently occurring combination to the least frequently occurring combination. This can be done in response the frequency analysis (step 132) wherein the respective frequencies of the combinations of bits are determined.

After selecting the specific order of the combinations of bits, the specific control code can be selected from the plurality of control codes that correspond to the selected order. This can be done in response to the relationship analysis (step 134). If during the relationship analysis (step 134), it is determined that the requisite relationship exits, a control code implicating the first position code routine can be selected. Accordingly, the odd numbered control code corresponding to the selected order can be selected from the control code index 60. Alternatively, if the relationship analysis (step 134) determines that the requisite relationship does not exist, a control code implicating the second position code routine can be selected. Accordingly, the even numbered control code corresponding to the selected order can be selected from the control code index 60.

E. Position Code Generation

After the control code 42, 44 has been generated (step 140), a position code 52, 54 is generated (step 150) for each of the blocks of data 22, 24. The position code 52, 54 identifies the position of each combination of bits in an order signified by the control code 42, 44. The position code 52, 54 can be generated through the use of two different position code routines that each identify the position of the combinations in a different fashion. Accordingly, the step of generating a position code (step 150) preferably comprises the steps of determining which position code routine is indicated by the control code 42, 44 (step 152) and generating the position code 52, 54 utilizing the appropriate position code routine (step 154).

For example, as detailed above, two different control codes can be assigned to each of the orders of combinations. As shown in the control code index 60, the control codes 00011000 and 00011011, numbered 1 and 2 respectively, can both be assigned to the same order of combinations of bits (00, 01, 10, 11) with the odd numbered control code (00011011) signifying the first position code routine and the even numbered control code (00011000) signifying the second position code routine. In response to each of these control codes, the position code 52, 54 can be generated using the appropriate position code routine.

The first position code routine identifies the position of the combinations by determining whether or not each of the combinations of bits matches the successive groups of bits that comprise the blocks of data 22, 24. Starting with the first group of two bits from the first block of data 22, the group of bits is compared with the first combination of bits, as identified in the control code 42, to determine whether or not the two sets of bits match. If they do match, a 1 is recorded to signify a match at that position within the block of data 22. If they do not match, a 0 is recorded to signify a non-match at that position. This process is repeated until each of the successive groups of bits that comprise the block of data 22 has been compared with the first combination.

Next, the groups that did not match the first combination are compared with the second combination to determine whether or not these sets of bits match. Again, if they do match, a 1 is recorded while a 0 is recorded if they do not match. The groups that did not match either the first or second combinations are then compared with the third combination and matches and non-matches are again recorded as described herein. This process continues until each of the groups of bits within the block of data 22 has been identified as matching a combination of bits. The resulting string of 1s and 0s, identifying the matches and non-matches, is the position code 52.

The second position code routine also identifies the position of the combinations by determining whether or not each of the combinations matches the successive groups of bits that comprise the blocks of data 22, 24. However, the combinations are compared with the groups of bits in a different manner. Starting with the first group of two bits of the first block of data 22, the group of bits are compared with both the first and second combinations, as identified in the control code 42. If the group of two bits matches either the first or second most frequent combinations, a 1 is recorded to signify a match at that position with respect to the block of data 22. This comparison process is repeated for each of the successive groups of two bits that comprise the block of data 22.

After each of the successive groups of bits have been compared with first and second combinations, a string of 1s and 0s results where the 1s signify matches with the first or second combinations and the 0s signify matches with the third or fourth combinations. Next, the groups that were identified in the first pass as matching the first or second combinations, i.e., those groups designated with a 1, are analyzed again to determine whether or not they match the first combination. If the group matches the first combination, a 1 is recorded, while a 0 is recorded if the group does not match the first combination. Next, the groups that were identified in the first pass as not matching the first or second combinations, i.e., those groups designated with a 0 in the first pass, are analyzed to determine whether or not they match the third combination. If the group matches the third combination, a 1 is recorded, while a 0 is recorded if the group does not match the third combination. The resulting string of 1s and 0s, identifying the matches and non-matches, is the position code 52.

The position code 52 resulting from either the first or second position code routines can be combined with the control code 42 as indicated below. It is important to note that the process of generating the control code 42, 44 and the position code 52, 54 is repeated for each block of data 22, 24 and that different position code routines can be used to generate the position codes for each of the blocks of data 22, 24. It is also important to note that the control code 42, 44 and the position code 52, 54 can vary from the blocks of data 22, 24.

F. Combining the Codes

After both the control code 42, 44 and the position code 52, 54 have been generated for each of blocks of data 22, 24, these codes can be combined along with the block codes 32, 34 (step 160). The codes are preferably combined based upon the block that they are associated with. Thus, the control code 42, block code 32 and position code 52 that correspond to the first block of data 22 are combined in sequence as shown in FIG. 1. The combined codes can also be combined with a master header 70 to create an encrypted string of data 80. The master header 70 preferably comprises 32 bytes of data and includes the original file name, the original file creator's name, the original file type, and the original file size as known to those skilled in the art. In addition, the master header 70 preferably includes an indication of the number of iterations of the present encryption system that were performed on the input data string 20 when multiple iterations are utilized as described herein.

G. Additional Encryption

During the encryption process described above, additional encryption can be used to further enhance the encryption of the resulting encrypted data string 80. The additional encrypting preferably comprises an exclusive OR (XOR) function as known to those skilled in the art. The XOR function preferably enables a key comprising one or more bytes of data to be XORed with the encrypted string of data 80 after implementing the present methods. The key can comprise any form of digital data including image data, sound data, voice data, retina scan data, and text swipe data, as well as other forms of digital data as known to those skilled in the art. The key preferably comprises 512 bytes of data. The additional encryption can be applied to the data prior to or following the encryption process described herein.

The additional encryption can be implemented in response to the control code 42, 44. The control code 42, 44 can be used to signify the use of the additional encryption as well as the stage within the encryption process that the additional encryption is implemented.

II. Data Transmission and Decryption

The resulting encrypted data string 80 can be stored and/or transmitted as known to those skilled in the art. In addition, the encrypted data string 80 can be decrypted by performing the reverse functions as described above. It is important to note that in order to the decrypt the encrypted data string 80, the decryption routine must be able to access information regarding the control codes used generating the encrypted data string 80.

III. EXAMPLE

The above method can be used to generate an encrypted data string as illustrated in the following example. The process begins when a sample input data string consisting of 768 bytes of data is received. The 768 bytes of data are divided into a plurality of blocks of data each comprising a random number of bytes of data. The specific number of bytes of data that comprise each block of data is determined in response to a random number generator. Assume for purposes of this example that the first block of data comprises 138 bytes of data and the block code for the first block of data is 00000000-00000000-00000000-00000000-00000000-00000000-00000000-10001010. Also assume for purpose of this example that the first 16 bits of data from the first block of data are 0010010000110010. While this example illustrates how this 16 bit portion of a single block of data is encrypted, it is important to remember that the remainder of the block of data as well as the additional blocks of data can be processed as demonstrated in this example.

The 16 bits of data are analyzed by examining successive groups of two bits of the data. Accordingly, the 16 bits of data is broken down into 8 groups of two bits of data as follows: 00-10-01-00-00-11-00-10. These groups of two bits of data are first analyzed to determine the relative frequency of each of the four different combinations of two bits with respect to one another. In analyzing the four combinations of bit, it can be determined that the combination 00 occurs four times; the combination 10 occurs two times; the combination 01 occurs one time and the combination 11 also occurs one time. Accordingly, because the combination 00 occurs most often, it can be designated the most frequent combination (Freq1). The combination 10 can be designated the second most frequent (Freq2), with the combination 01 being the third most frequent (Freq 3) and the combination 11 being the fourth most frequent (Freq 4). In this example, even though the combinations 01 and 11 occur the same number of times, the 01 is deemed the third most frequent based upon a default setting that mandates that the lower number takes precedence over the larger number when determining the frequency order.

The combinations can then be analyzed to determine whether a predetermined relationship exists between the first, third, and fourth combinations. The relationship between the first, third, and fourth combinations can be evaluated based upon the following equation: [Freq1>(Freq3+Freq4)]. Here, the result is 4>3, a true statement. Thus, the predetermined condition is satisfied and the relationship between the first, third, and fourth combinations is determined to exist.

In response to the frequency and relationship analyses, a control code can be generated though the use of the control code index 62, depicted in FIG. 3. The control code index 62 can be used to select the control code that indicates both the appropriate order of the combinations of bits and the appropriate position code routine. In this example, the combinations of bits are arranged in descending order from most to least frequent based upon the relative frequency of each of the combinations of bits. Accordingly, the control code for the present example can indicate the following order for the four different combinations: 00, 10, 01, 11. The control codes corresponding to this order are found at numbers 5 and 6 in the control code index 62.

Additionally, because the predetermined condition with respect to the first, third, and fourth combinations is satisfied, as indicated above, the first position code routine can be implemented to generate the position code. Accordingly, the control code corresponding to the selected order and indicating the first position code routine is selected. Because the odd numbered control codes signify the first position code routine, the control code 00100100 located at number 5 in the control code index 62, can be selected as the control code.

Alternatively, if the predetermined relationship between the first, third, and fourth combinations was not satisfied, the second position code routine could be implemented to generate the position code. Accordingly, the control code corresponding to the selected order and indicating the second position code routine is selected. In this case, because the even numbered control codes signify the use of the second position code routine, the control code 00100111, located at number 6 in the control code index 62 could be selected as the control code.

In response to the generation of the control code, a position code can be generated that identifies the position of each of the combinations of bits with respect to the block of data. The first 16 bits of the first block of data consists of 8 successive groups of two bits of data as described above. The first position code routine first identifies whether or not the first combination of two bits (00), as dictated by the control code, matches the 8 different groups of two bits. As each of the successive groups of bits is compared with the first combination, a 1 or 0 is recorded to signify whether or not a match occurs. A 1 is used to signify a match between the combination and the group of bits in the particular position, while a 0 is used to signify that the combination and the group at that position do not match. The first position code routine then identifies whether or not the second combination (10) matches the groups of bits in those positions not already identified as matching the first combination. This process is repeated for the third combination (01). After the third combination has been compared to the groups of bits, the groups remaining unmatched are known to match the fourth combination (11). This process can be graphically illustrated as shown below.

| Sample Input Data String | | | | | | | |
| --- | --- | --- | --- | --- | --- | --- | --- |
| 00 | 10 | 01 | 00 | 00 | 11 | 00 | 10 |
| first pass (00) 1 | 0 | 0 | 1 | 1 | 0 | 1 | 0 |
| second pass (10) — | 1 | 0 | — | — | 0 | — | 1 |
| third pass (01) — | — | 1 | — | — | 0 | — | — |

After each position has been identified with the corresponding combination of two bits, the position code 10011010100110 results. The first eight bits identify the positions of the combination 00, the next four bits identify the positions of the combination 10, the next two bits identify the position of the combination 01. The 11 combination can be presumed to occupy the remaining unmatched positions. The resulting control code, block code and position code can be combined along with a master header to create an encrypted string of data.

Alternatively, if the data analyses produced a different result and the control code was selected to indicate that the second position code routine is to be implemented, the following example is representative. Again, the 16 bits are analyzed as 8 successive groups of two bits. In response to the control code, each of the successive groups of two bits is examined to determine whether it matches either the first or second combinations, as determined by the control code. If the group of bits matches either of the combinations, a 1 can be recorded to signify a match at that position. If the group does not match either of the combinations, a 0 can be recorded to signify a non-match at that position. The resulting string of bits includes a 1 representing the occurrence of the first or second combinations and 0 representing the occurrence of the third or fourth combinations.

Next, the groups identified as matching either the first or second combinations (i.e., the 1s identified in the first pass) can be examined. The groups are examined to determine whether or not they match the first or second combination. If the group matches the first combination, a 1 is recorded to signify a match at that position. If the group does not match the first combination, a 0 is recorded to signify a non-match at that position. After examining all of the groups identified with a 1 in the first pass, the groups identified with a 0 in the first pass can then be examined. These groups are examined to determine whether or not they match the third most frequent combination. If the groups match the third combination, a 1 is recorded to signify a match at that position. If the group does not match the third combination, a 0 is recorded to signify a non-match in that position.

This can be graphically illustrated as shown below.

(first combination (Freq1)=00, second combination (Freq2)=10, third combination (Freq3)=01, fourth combination (Freq4)11)

|                    | 00 | 10 | 01 | 00 | 00 | 11 | 00 | 10 |
|--------------------|----|----|----|----|----|----|----|----|
| first pass (00 & 10) | 1  | 1  | 0  | 1  | 1  | 0  | 1  | 1  |
| second pass (00)   | 1  | 0  | —  | 1  | 1  | —  | 1  | 0  |
| third pass (01)    | —  | —  | 1  | —  | —  | 0  | —  | —  |

Upon completion of this process, a position code can be generated as follows: 1101101110111010. This position code can be combined with the control code (00100111), block code and a master header to produce an encrypted string of data as indicated above.

IV. ALTERNATIVE EMBODIMENTS

In alternative embodiments, successive iterations of the above encryption method can be performed on the data at various times. For example, in one embodiment, after the control code 42, block code 32, and position code 52 corresponding to a block of data have been combined, the encryption method can again be performed on the string of data resulting from the combined codes. Alternatively, after the control codes 42, 44, block codes 32, 34, and position codes 52, 54 corresponding to a plurality of blocks of data have been combined into a single string of data, the encryption method can be performed on the single string of data comprising the combined codes corresponding to the plurality of blocks.

In another alternative embodiment, the control code 42, 44 can comprise any number of bits and can be adapted to indicate the use of two or more position code routines. Control codes consisting of different numbers of bits can be included in the control code index 60 by adding additional entries to the control code index 60. The additional entries can include control codes associated with groups of three or more bits as depicted in the control code index 64 shown in FIG. 4.

In another alternative embodiment, the size of the blocks of data can be determined in response to a formula. For example, the block size can be selected such that the input data string is divided into at least a predetermined number of blocks, for example four blocks. Alternatively, the block size can be selected such that the size of the blocks does not exceed a predetermined size limitation. The predetermined size can be selected by a user or in relation to the amount of random access memory allocated to the encryption application. Alternatively, the block size can be preset such that each block of data contains a predetermined number of bits. If the block size is preset, it should be noted that the block code 32, 34 may not be required.

In another alternative embodiment, after the input data string is divided into blocks of data, each of the blocks of data can be simultaneously processed in accordance with the above method and the resulting control codes, block codes, and position codes corresponding to each of the blocks of data can be combined to form a single encrypted data string.

In a further alternative embodiment, the control code can be generated without analyzing the data (step 130, FIG. 1). For example, the control code can be automatically generated based on a default setting whereby a specific control code is automatically selected from the control code index 60. Alternatively, the control code can be generated in a random or non-random fashion through the use of the control code index 60.

In another alternative embodiment, the groups of bits that are analyzed within the blocks of data can comprise three or more bits. In addition, the number of bits that comprise the groups of bits that are analyzed can vary for each block of data that is analyzed.

In another alternative embodiment, the position code routines can utilize a 0 to indicate a match between the combination of bits and the group of bits being compared and a 1 can be used to signify a non-match between the combination and the group of bits.

In another embodiment, three or more different position code routines can be used to generate the position code. Each of these additional position code routines can be implemented through the use of additional control codes that signify the use of such routines as shown in FIG. 4 and described above.

In another alternative embodiment, when combining the control codes, block codes, and position codes to form the encrypted string of data, additional data can be appended to the encrypted string of data that indicates the size of the original input data string. This can be used as a check to ensure proper decryption of the encrypted string of data.

In another alternative embodiment, the key used to perform the additional encryption, as described above, can be appended to the input data string prior to encryption thereby altering the encryption of the input data string.

V. PLATFORM EMBODIMENTS

Referring now to FIG. 5, a block diagram of one embodiment of a device 310 is shown. The device 310 preferably comprises a personal computer such as a desktop or portable notebook, although in alternative embodiments, the device 310 can be implemented as mainframe computers and minicomputers as well. In further alternative embodiments, the device 310 can be implemented in various other platforms. For example, the device may be implemented as a portable electronic system such as cellular telephone, or may be implemented on a personal digital assistant. The device 310 may also be implemented in a networked environment or on a client-server platform.

Referring to the embodiment illustrated in FIG. 5, the device 310 is a combination of hardware and software components. In one embodiment, the device 310 includes a processor 312, hardware 314 connected to the processor 312, and a non-volatile memory storage device 316 for storing an encryption software program 318, as well as other information. The processor 312 may be of any type used personal computers as known to those skilled in the art. Processor types other than these, as well as processors that may be developed in the future, are also suitable.

The device 310 may also include a data input/output system 324 for enabling the receipt of the transfer of data to and from the device as known to those skilled in the art. The device 310 also includes a user interface 331. The user interface 331 includes appropriate equipment that allows the end-user to input information into the device. This input information may include a request to modify or alter the encryption properties of the device. For example, the input information may include a request for a user to provide a key for use during encryption. The input information may also include other kinds of information as known to those skilled in the art. The equipment used to input information into the device 310 may include a keypad, a keyboard, a microphone, etc., as well as appropriate software, such as a voice recognition program. The user interface 331 also includes suitable equipment that provides information such as the status of the encryption process back to the end-user. This equipment may include a display 327 or other means.

Referring again to FIG. 5, the encryption software program 318 is loaded from the non-volatile memory 316 into a RAM 320 associated with the processor 312 in order to operate the device. The encryption software program 318 may include separate applications (or subprograms) that provide various encryption features and functions described above. These functions and features may include dividing the input data string into blocks of data and generating a block code, analyzing the data within the blocks, generating a control code utilizing a control code index, generating a position code, and other functions as described herein. The encryption software program 318 is written in the C programming language although in alternative embodiments other programming languages may be used, such as C++, Java, etc. In addition, the software encryption program 318 can be implemented through the use of any operating system such as Windows, Unix, etc.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

What is claimed is:

1. A method of encrypting an input data string including a plurality of bits of binary data with a processing device communicatively coupled to a memory having executable instructions stored therein which cause the processing device to implement a method of encryption, the method comprising:

receiving the input data string for encryption at the processing device;

providing a control code index in the memory, the control code index being defined prior to encryption at the processing device, the control code index including a plurality of control codes each defining respective orders of n bit combinations of binary data, the respective orders of bit combinations of each control code defining control code segments;

determining an order in which to query the presence of each of $2^n$ different configurations of n bits within the input data string, the determined order being selected without any analysis of the input data string;

identifying a control code associated with the determined order using the control code index;

generating a position code using the identified control code in cooperation with a position cede routine associated with the identified control code to determine positions of each of the $2^n$ different configurations of n bits in the input data string by comparing the $2^n$ different configurations of n bits within the input data string with a first one of the control code segments of the identified control code to identify which n bit segments of the input data string correspond to a first n bit segment within the control code, comparing additional ones of the control code segments in a serial fashion to previously unidentified ones of the n bit segments of the input data string, correspondences to the control code segment comparisons resulting in output values dictated by the position code routine which defines the generated position code; and combining the identified control code and the generated position code as components of an encrypted data string.

2. The method of claim 1, wherein determining an order comprises selecting a predetermined order.

3. The method of claim 2, wherein selecting a predetermined order includes selecting a default order.

4. The method of claim 1, further comprising:

dividing the input data string into a plurality of blocks of data.

5. The method of claim 4, wherein the number of bits within each of the plurality of blocks of data is individually determined in response to a random number generator.

6. The method of claim 4, wherein dividing the input data string into a plurality of blocks of data, includes determining the individual number of bits within each of the plurality of blocks of data in accordance with a rule set.

7. The method of claim 4, further comprising: generating a plurality of block codes associated with a plurality of blocks of data of the input data string, each block code indicating the number of bits within the associated block of data.

8. The method of claim 7, further comprising: combining each of the plurality of block codes with the identified control code and the generated position code for the associated block of data.

9. The method of claim 4, wherein determining an order includes determining a first order associated with a first block of data and determining a second order associated with a second block of data wherein the first order is different than the second order.

10. The method of claim 1, wherein identifying the control code includes randomly selecting the control code via a random number generator.

11. The method of claim 1, wherein determining an order includes generating an order using a rule set.

12. The method of claim 1, wherein determining the order in which to query the presence of each of $2^n$ different configurations of n bits within an input data string includes determining the order in which to query the presence of each of 4 different configurations of 2 bits within an input data string.

13. The method of claim 1, further comprising:
performing a further encryption of the encrypted data string.

14. The method of claim 13, wherein performing a further encryption of the encrypted data string, further comprises:
providing an encryption key having a first selected number of bits; and
performing an XOR function between the encryption key and the encrypted data string.

15. The method of claim 13, wherein performing a further encryption of the encrypted data, further comprises:
determining an order in which to query the presence of each of $2^n$ different configurations of n bits within the input data string each control code defining respective orders of n bit combinations of binary data;
identifying a second control code associated with the determined order using the control code index;
generating a position code using the identified control code in cooperation with a position code routine associated with the identified control code to determine positions of each of the $2^n$ different configurations of n bits in the input data string by comparing the $2^n$ different configurations of the input data string with the associated $2^n$ bit configurations of the identified control code, the comparisons resulting in output values dictated by the position code routine which defines the generated position code; and
combining the second identified code and the second generated position code to create a different encrypted version of the encrypted data string.

16. A method for encrypting an input data string, including a plurality of bits of binary data, the method comprising:
receiving the input data string for encryption;
providing a control code index, the control code index being defined prior to encryption, the control code index including a plurality of control codes each defining respective orders of n bit combinations, of binary data the respective orders of bit combinations of each control code defining control code segments;
determining an order in which to query the presence of each of $2^n$ different configurations of n bits within the input data string, the determined order being selected without any analysis of the input data string;
identifying a control code associated with the determined order using the control code index;
generating a position code using the identified control code in cooperation with a position code routine associated with the identified control code to determine positions of each of the $2^n$ different configurations of n bits in an input data string by comparing the $2^n$ different configurations of n bits within the input data string with a first one of the control code segments of the identified control code to identify which n bit segments of the input data string correspond to a first n bit segment within the control code, comparing additional ones of the control code segments in a serial fashion to previously unidentified ones of the n bit segments of the input data string correspondences to the control code segment comparisons resulting in output values dictated by the position code routine which defines the generated position code; and
combining the identified control code and the generated position code as components of an encrypted data string.

17. The method of claim 16, further comprising
arranging the input data string into a plurality of data blocks.

18. A computer readable storage medium including computer program instructions that cause a computer to implement a method of encrypting an input data string, including a plurality of bits of binary data, the method comprising:
receiving the input data string for encryption;
providing a control code index that is defined prior to encryption, the control code index including a plurality of control codes each defining respective orders of n bit combinations of binary data, the respective orders of bit combinations of each control code defining control code segments;
determining an order in which to query the presence of each of $2^n$ different configurations of n bits within the input data string, the determined order being selected without any analysis of the input data string;
identifying a control code associated with the determined order using the control code index;
generating a position code using the identified control code in cooperation with a position code routine associated with the identified control code to determine the positions of each of the $2^n$ different configuration of n bits in the input data string by comparing the $2^n$ different configurations of n bits within the input data string with a first one of the control code segments of the identified control code to identify which n bit segments of the input data string correspond to a first n bit segment within the control code, comparing additional ones of the control code segments in a serial fashion to previously unidentified ones of the n bit segments of the input data string, correspondences to the control code segment comparisons resulting in output values dictated by the position code routine which defines the generated position code; and
combining the identified control code and the generated position code as components of an encrypted data string.

19. The computer readable storage medium including computer program instructions of claim 18, wherein determining an order includes selecting a predetermined order.

20. The computer readable storage medium of claim 19 wherein selecting a predetermined order includes selecting a default order.

21. The computer readable storage medium of claim 18, further comprising:
dividing the input data string into a plurality of blocks of data.

22. The computer readable storage medium of claim 21, wherein dividing the input data string into a plurality of blocks of data includes determining the individual number of bits within each of the plurality of blocks of data in response to a random number generator.

23. The computer readable storage medium of claim 21 wherein dividing the input data string into a plurality of blocks of data, includes determining the individual number of bits within each of the plurality of blocks of data in accordance with a rule set.

24. The computer readable storage medium of claim 21 wherein determining an order further comprises:
   determining a first order associated with a first block of data and determining a second order associated with a second block of data wherein the first order is different than the second order.

25. The computer readable storage medium of claim 21 wherein the computer program instructions further comprise:
   generating a plurality of block codes associated with a plurality of blocks of data, each block code and indicating the number of bits within the associated block of data.

26. The computer readable storage medium of claim 25 wherein the computer program instructions further comprises:
   combining the each of the plurality of block codes with the identified control code and the generated position code for the associated block of data.

27. The computer readable storage medium of claim 18 wherein identifying the control code includes randomly selecting the control code via a random number generator.

28. The computer readable medium of claim 18 wherein determining an order including generating an order using a rule set.

29. The computer readable storage medium of claim 18 wherein determining the order in which to query the presence of each of $2^n$ different configurations of n bits of binary data within an input data string includes determining the order in which to query the presence of each of 4 different configurations of 2 bits within an input data string.

30. The computer readable storage medium of claim 18 wherein the computer program instruction, further comprise performing a further encryption of the encrypted data string.

31. The computer readable storage medium of claim 30 wherein encrypting the encrypted data string comprises:
   providing an encryption key having a first selected number of bits; and
   performing an XOR function between the encryption key and the encrypted data string.

32. The computer readable storage medium of claim 30 within encrypting the encrypted data string comprises:
   determining an order in which to query the presence of each of $2^n$ different configurations of n bits within the input data string;
   identifying a second control code associated with the determined order using the control code index each control code defining respective orders of n bit combinations of binary data;
   generating a position code using the identified control code in cooperation with a position code routine associated with the identified control code to determine positions of each of the $2^n$ different configurations of n bits in the input data string by comparing the $2^n$ different configurations of the input data string with the associated $2^n$ bit configurations of the identified control code, the comparisons resulting in output values dictated by the position code routine which defines the generated position code; and
   combining the second identified control code and the second generated position code to create a different encrypted version of the encrypted data string.

33. An electronic device for encrypting an input data string, including a plurality of bits of binary data, comprising:
   a processor configured to receive the input data string for encryption;
   a memory configured to include a control code index, the control code index being defined prior to encryption by the processor, the control code index including a plurality of control codes, the control codes having corresponding values each defining respective orders of n bit combinations of binary data, the respective orders of bit combinations of each control code defining control code segments,
   wherein the processor is operably linked to the memory for determining upon reception of the input data string, an order in which to query the presence of each of two $2^n$ different configurations of n bits within the input data string, the determined order being selected without any analysis of the input data string, and identifies a control code associated with the determined order by access of the control code index, the processor generating a position code, using the identified control code in cooperation with a position code routine associated with the identified with the identified control code to determine positions of each of the two $2^n$ different configurations of n bits in the input data string by comparing the $2^n$ different configurations of n bits within the input data string with a first one of the control code segments of the identified control code to identify which n bit segments of the input data string correspond to a first n bit segment within the control code, comparing additional ones of the control code segments in a serial fashion to previously unidentified ones of the n bit segments of the input data string, correspondences to the control code segment comparisons resulting in output values dictated by the position code routine which defines the generated position code to combine the identified control code and the generated position code as components of an encrypted data string.

* * * * *